United States Patent [19]

Adamek

[11] Patent Number: 4,844,676
[45] Date of Patent: Jul. 4, 1989

[54] SELF-PENETRATING SCREW

[75] Inventor: Stanley C. Adamek, Lombard, Ill.

[73] Assignee: Pheoll Manufacturing Company, Inc., Chicago, Ill.

[21] Appl. No.: 922,327

[22] Filed: Oct. 23, 1986

[51] Int. Cl.$^4$ .................................... F16B 25/00
[52] U.S. Cl. .................................... 411/386; 411/413; 411/417
[58] Field of Search ............... 411/411–415, 411/417, 386, 387, 399

[56] References Cited

U.S. PATENT DOCUMENTS

| | | | |
|---|---|---|---|
| 3,124,408 | 3/1964 | Oestereicher | 411/415 |
| 3,827,331 | 8/1974 | Muenchinger | 411/387 |
| 3,978,760 | 9/1976 | Muenchinger | 411/386 |
| 4,179,976 | 12/1979 | Sygnator | 411/413 |
| 4,311,423 | 1/1982 | Hirabayashi | 411/387 |

FOREIGN PATENT DOCUMENTS 2111157 6/1983 United Kingdom ............ 411/386

Primary Examiner—Neill R. Wilson
Attorney, Agent, or Firm—Lockwood, Alex, FitzGibbon & Cummings

[57] ABSTRACT

A self-penetrating screw for penetrating sheet metal and then bolting a panel or other member to the penetrated sheet. The screw is hardened and has a penetrating point, a bolt-like shank and a head. The bolt-like shank is provided with machine screw threads and the tapered penetrating point has space threads with a pitch substantially greater, and preferably twice, the pitch of the machine screw thread. The screw is further characterized in having a tapered transition section joining the machine threads on the bolt-like shank with the space threads on the self-penetrating point which transition section is specially shaped with smooth cam-like surfaces so as to (1) maximize the axial dimension of the collar-like nut integrally formed in the sheet metal by the penetrating point, (2) radially expand the internal diameter of the integral not to approximately the pitch diameter of the machine screw threads on the bolt-like shank, and (3) iron out the threads internally formed in the integral nut by the self-penetrating point.

5 Claims, 2 Drawing Sheets

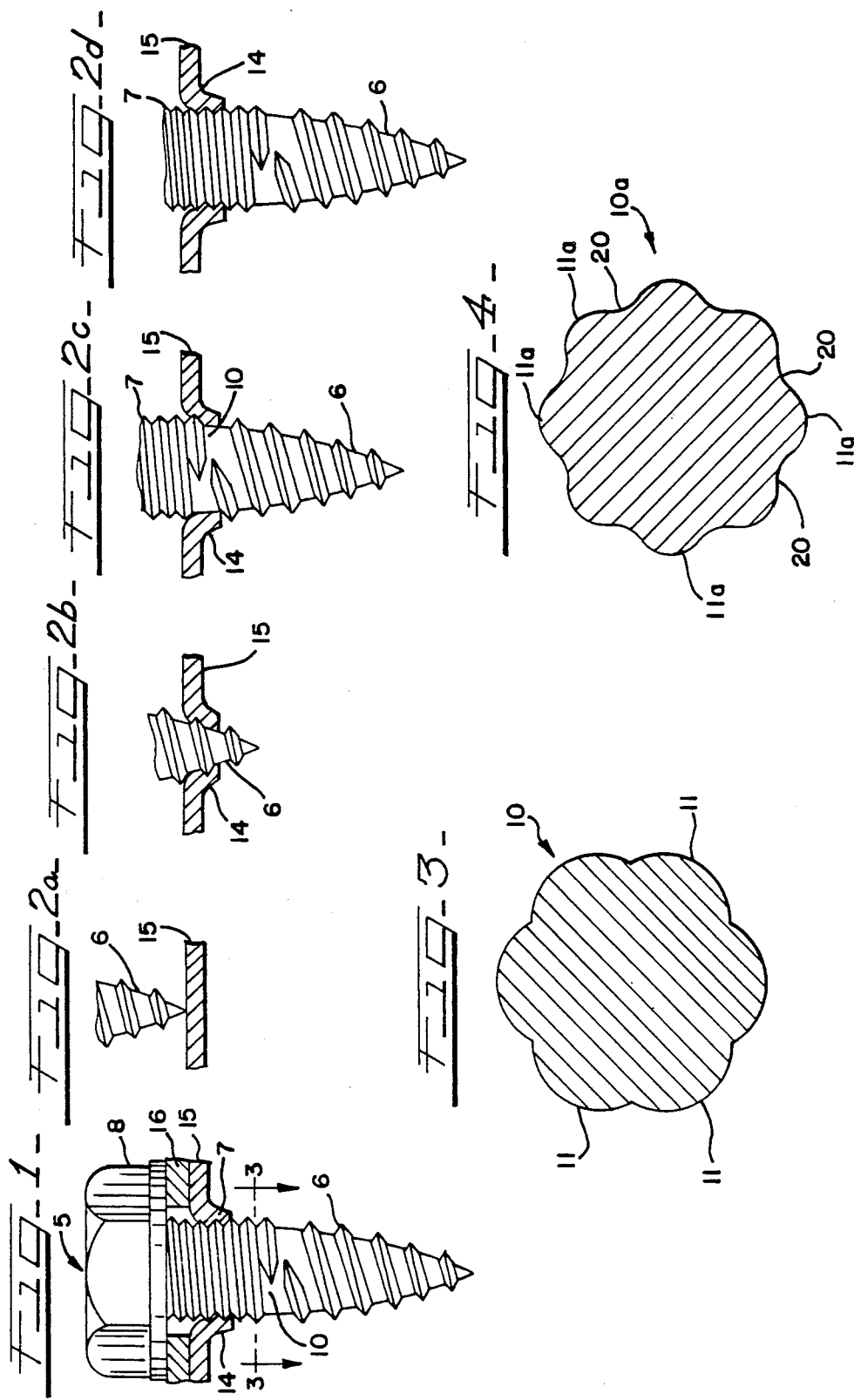

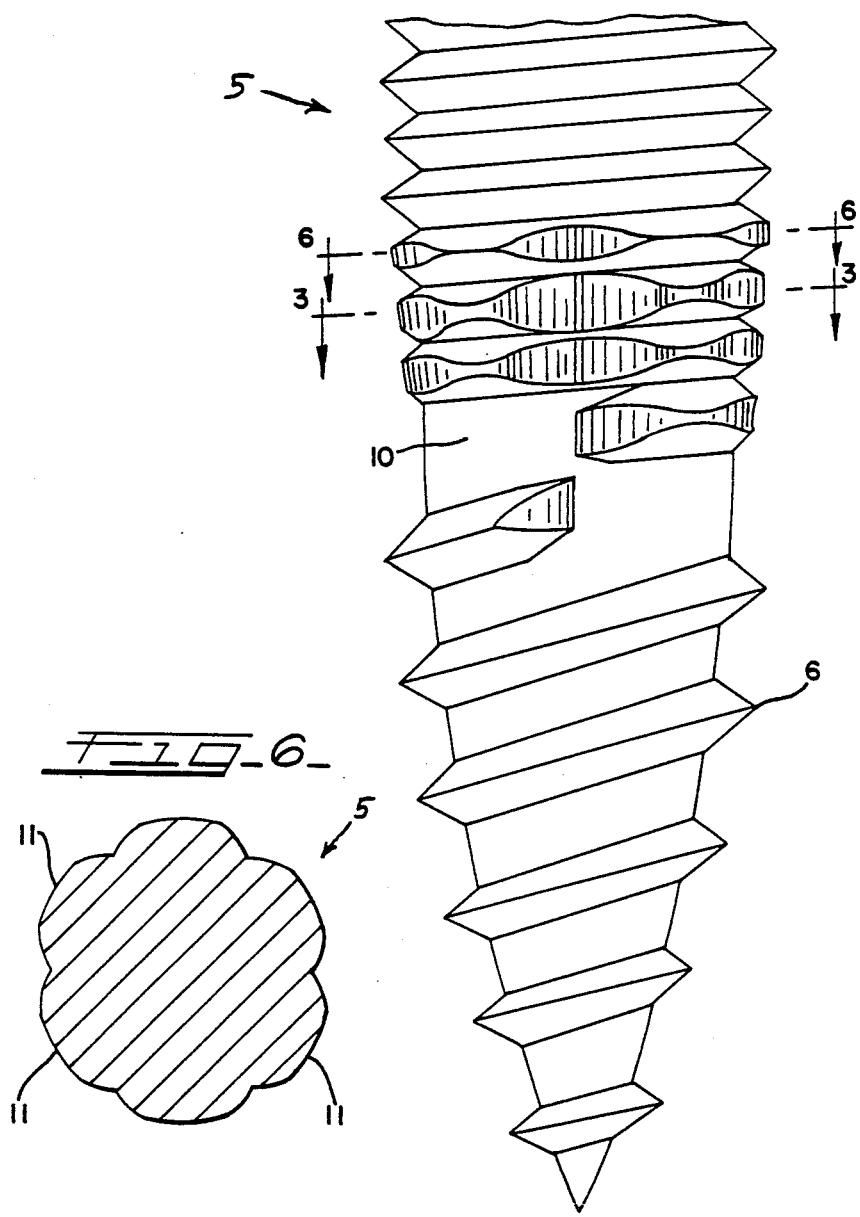

SELF-PENETRATING SCREW

SPECIFICATION

This invention relates, generally, to innovations and improvements in self-penetrating screws used to penetrate sheet metal members and attach other objects or members thereto. Screws of this general type are known and disclosed for example in U.S. Pat. No. 4,179,976 dated Dec. 25, 1979. More specifically, the invention relates to self-penetrating screws adapted to penetrate sheet metal and integrally form nuts therein which become internally threaded by the forming action of machine-like threads on the shank portions of the screws so as to provide a strong nut-and-bolt fastener action and high resistance to stripping.

In the automotive and appliance industries there is wide use of sheet metal panels and other sheet metal parts to which various other members and parts are secured or fastened. In order to economize on material costs and reduce weight, the latter especially in the auto industry, the trend has been to minimize the thickness of the sheet metal stock. Such reduction in thickness has encountered several limitations, an important one being the inability of widely used self-penetrating screw fasteners to integrally form collar-like nuts in the relatively thin sheet material which provide adequate resistance to stripping.

The object of this invention, generally stated, is the provision of improved self-penetrating screws which are particularly suited for use in attaching by nut-and-bolt fastening action various objects such as panel members to penetrable pieces of relatively thin sheet metal.

A more specific object of the invention is the provision of such improved self-penetrating screws which incorporate a transition section integrally interconnecting the adjoining ends of a cylindrical shank having machine screw-like threads thereon with the proximal end of a tapered self-penetrating point having space threads thereon, the transition section being non-circular in cross-section and having cam surfaces on its periphery which act to (1) radially expand and axially extrude the collar-like nuts integrally formed in the sheet metal by the tapered self-penetrating pointed ends and (2) iron out the threads formed on the interiors of such nuts by the space threads.

A further object of the invention is the provision of such self-penetrating screws which are characterized by their ability to integrally form in the sheet metal, collar-like nuts which have increased axial lengths and offer increased resistance to stripping.

Certain other objects of the invention will become apparent from the following description of a self-penetrating screw embodying the invention taken in conjunction with the accompanying drawings, wherein:

FIG. 1 is an enlarged side elevational view of a self-penetrating screw embodying the invention shown securing a bearing panel to a sheet metal application panel by nut-and-bolt fastening action, the panel members being shown fragmentarily and in section;

FIGS. 2a-2d are fragmentary views on enlarged scale depicting in stages the penetrating and nut forming action of the self-penetrating screw shown in FIG. 1;

FIG. 3 is a magnified cross-sectional view taken on line 3-3 of FIG. 1; and

FIG. 4 is a magnified cross-sectional view of a modification.

Referring to FIG. 1, a self-penetrating screw is indicated generally at 5 embodying and representative of the present invention. The screw 5 has a tapered penetrating pointed end 6, a cylindrical bolt-like shank 7, and hex head 7. The shank 7 has machine screw threads while the tapered point 6 has space threads which have a pitch greater than (e.g. twice) the pitch of the machine screw threads. The machine screw threads and space threads preferably have the same profile in cross-section.

The cylindrical bolt-like shank 7 and tapered penetrating pointed end 6 are integrally joined by a tapered transition section 10 (FIG. 1) whereon the machine threads and space thread overlap or merge. The nature and configuration of the transition section 10 are more fully shown in and described in connected with FIGS. 3 and 4. The tapered surface of the transition section is non-circular and has a plurality (e.g. six) smooth and shaped lobes or protuberances 11-11 whereon the adjacent ends of the machine thread 12 and space thread 13 terminate and meet. As will be described below in connection with FIGS. 2a-2d the lobes 11-11 act as cams in radially expanding and axially extending the collar like nuts 14 (FIG. 1) formed in a sheet metal panel 15 to which is attached a bearing penetrated panel or other member 16.

The self-penetrating screw 5 may be formed in production quantities from machine-produced blanks using known and readily available screw producing equipment and techniques. For example the non-circular transition section 10 may be formed by shaped heading dies. The method of creating shape in heading dies can be accomplished by conventional hobbing and/or the electrical discharge method of metal machining. The respective diameter ratio of the leading space type thread and following machine screw thread can be varied with the space thread sufficiently smaller to allow the cam surfaces to be effective. The modified non-circular transition section 10a shown in FIG. 5 may be formed so as to have a plurality of arcuate cam surfaces 11a-11a interconnected by arcuate indentations 20-20. After a screw 5 has been fully formed from a blank it is hardened in known manner.

Reference may now be had to FIGS. 2a-2d for a description of the in-use self-penetrating and nut forming actions and qualities of the screw 5. In FIG. 2a the point 6 of the a screw 5 is shown engaging the desired location in the surface of the sheet metal panel 15. In FIG. 2b the point 6 is shown after having penetrated the sheet metal 15 and started the formation of the integral nut 14. In FIG. 2c the relationship between screw and sheet metal is shown wherein the transition section 10 is rotating within the nut 14. Thereafter in FIG. 2d the screw to sheet metal relationship is shown wherein the machine screw thread on the shank 7 have entered the nut 14 and formed mating internal threads therein.

It will be understood that it is in the relationship illustrated in FIG. 2c that the unique concomitant expanding, extruding and ironing action of the transition section 10 occurs. It is here whereat the rotating cam surfaces act on the interior surface of the partially formed collar nut 14 to simultaneously radially expand, axially lengthen, and internally iron out the collar nut 14 and make it ready to receive the machine screw thread on the cylindrical shank 7. As previously stated, it is preferable that the internal diameter of the nut 14 be expanded to where it is equal to the pitch diameter of the machine screw threads on the shank 7.

It will be understood that various changes and modifications can be made in the screw 5 while retaining the essential features of the invention. Thus, the dimensions of the self-penetrating pointed end 6 and shank 7 may be changed and different types of the head 8 may be used. With respect to the transition section 10 different caming formations and surfaces may be used.

What is claimed is:

1. A self-penetrating screw fastener for penetrating sheet metal and bolting a separate member thereto, including a tapered penetrating pointed end which is circular in cross-section, a cylindrical bolt-like shank, and a head;

said cylindrical bolt-like shank having machine screw-like threads of continuous uniform profile and crest diameter thereon;

said tapered penetrating pointed end having a space thread of continuous uniform profile extending the axial length thereof with the pitch of the threads thereon being substantially greater than the pitch of said machine screw-like threads;

the adjoining ends of the said cylindrical bolt-like shank and said circular tapered penetrating pointed end being integrally interconnected by a non-circular transition section at the junction of said machine screw-like threads and said space threads; and said non-circular transition section having a plurality of circumferentially arranged symmetrical discrete cam-like surfaces which provide a combined radially expanding, axially extruding and internal ironing action on the nut integrally formed in the sheet metal by said tapered penetrating point end.

2. A self-penetrating screw fastener as called for in claim 1 wherein the pitch of said space thread is about twice the pitch of said machine screw-like threads.

3. A self-penetrating screw fastener as called for in claim 1 wherein said transition section expands the internal diameter of said nut to approximately the pitch diameter of said machine screw-like threads.

4. A self-penetrating screw fastener as called for in claim 1 wherein said discrete cam-like surfaces are provided by circumferentially adjoining lobes.

5. A self-penetrating screw fastener as called for in claim 1 wherein said transition section has a plurality of arcuate cam surfaces interconnected by arcuate indentations.

* * * * *